United States Patent
Shvetsov et al.

(10) Patent No.: US 12,093,334 B2
(45) Date of Patent: *Sep. 17, 2024

(54) SYSTEM AND METHOD OF A CLOUD SERVER FOR PROVIDING CONTENT TO A USER

(71) Applicant: AO Kaspersky Lab, Moscow (RU)

(72) Inventors: Dmitry V. Shvetsov, Moscow (RU); Daniil A. Yazovsky, Moscow (RU); Anton E. Malov, Moscow (RU)

(73) Assignee: AO Kaspersky Lab, Moscow (RU)

(*) Notice: Subject to any disclaimer, the term of this patent is extended or adjusted under 35 U.S.C. 154(b) by 0 days.

This patent is subject to a terminal disclaimer.

(21) Appl. No.: 18/450,469

(22) Filed: Aug. 16, 2023

(65) Prior Publication Data

US 2023/0394104 A1    Dec. 7, 2023

Related U.S. Application Data

(63) Continuation of application No. 17/751,738, filed on May 24, 2022, now Pat. No. 11,768,902.

(30) Foreign Application Priority Data

Dec. 6, 2021   (RU) .......................... RU2021135827

(51) Int. Cl.
   *H04L 12/00*   (2006.01)
   *G06F 16/904*   (2019.01)
   (Continued)

(52) U.S. Cl.
   CPC .......... *G06F 16/954* (2019.01); *G06F 16/904* (2019.01); *G06F 16/906* (2019.01); *G06F 16/951* (2019.01); *G06F 16/953* (2019.01)

(58) Field of Classification Search
   CPC .... G06F 16/954; G06F 16/904; G06F 16/906; G06F 16/951; G06F 16/953; G06F 16/958; G06F 21/6254; G06Q 30/02
   (Continued)

(56) References Cited

U.S. PATENT DOCUMENTS

9,053,497 B2   6/2015 Benyamin
10,812,604 B2   10/2020 Miller et al.
(Continued)

FOREIGN PATENT DOCUMENTS

CN    113761244 A   * 12/2021   ............. H04L 12/00
CN    113987232 A   *  1/2022   ............. H04L 12/00
(Continued)

OTHER PUBLICATIONS

Lin T et al., CN 11,641,5065; Method For Searching Harmful Content Of Website, Involves Emptying Original Response Message For Website With Harmful Content And Popping Up Intercepting Page According To Searching Result, 3 Pages, Jul. 11, 2023 (Year: 2023).*

*Primary Examiner* — Frantz Coby
(74) *Attorney, Agent, or Firm* — ArentFox Schiff LLP; Michael Fainberg

(57) ABSTRACT

Disclosed herein are systems and methods of a cloud server for providing content to a user. In one aspect, an exemplary method comprises receiving data, from a user device, the data comprising at least one of: hash and type of intercepted search requests and site names, incrementing a value of a popularity counter of the received data, when the value of the popularity counter of the received data exceeds a predetermined threshold, sending an inquiry for the intercepted search requests and site names in plain form, and when the intercepted search requests and site names are received in plain form, performing categorization of the intercepted search requests and site names, and transmitting, to the user
(Continued)

device, content associated with the intercepted search requests and rules for establishing a category of the content.

20 Claims, 4 Drawing Sheets

(51) Int. Cl.
*G06F 16/906* (2019.01)
*G06F 16/951* (2019.01)
*G06F 16/953* (2019.01)
*G06F 16/954* (2019.01)

(58) Field of Classification Search
USPC .......................................................... 709/223
See application file for complete search history.

(56) References Cited

U.S. PATENT DOCUMENTS

| | | | |
|---|---|---|---|
| 11,768,902 B2* | 9/2023 | Shvetsov | .............. G06F 16/904 709/203 |
| 2003/0018778 A1 | 1/2003 | Martin et al. | |

FOREIGN PATENT DOCUMENTS

| | | | | | |
|---|---|---|---|---|---|
| CN | 116756168 A | * | 9/2023 | .............. | H04L 12/00 |
| CN | 118093965 A | * | 5/2024 | .............. | H04L 12/00 |

* cited by examiner

200

210

Intercept search requests and site-names In a browser and send to a content-provision tool

220

Compute a hash of the intercepted search request and site-name, determine a type of the intercepted search request and site name, and transmits the computed hash and the type of intercepted search request and site-name to a cloud server

240

Transmit the intercepted request and site-name to the cloud server in plain form

255

Receive, from the cloud server, content based on a categorization of the intercepted request and site-name and rules for establishing a category of the content

260 when the rules for establishing the category of the content are executed, displaying to the user, the content, wherein the displaying is performed on the computing device of the user in accordance with a category established based on the rules

320
Cloud server receives hash and the type of intercepted search request and site-name

330
Increment a popularity counter of the received data

340
Popularity counter exceed threshold? — No (loops back to 320)

Yes

345
Send inquiry for intercepted request and site-names in plain form

347
Receive intercepted request and site-names in plain form

350
Perform categorization of the intercepted request and site-name, and send content that is based on a categorization of the intercepted request and site-name and rules for establishing a category of the content

Fig. 3

SYSTEM AND METHOD OF A CLOUD SERVER FOR PROVIDING CONTENT TO A USER

CROSS REFERENCE TO RELATED APPLICATIONS

The present application is a continuation of U.S. patent application Ser. No. 17/751,738 which claims priority to Russian Patent Application No. 2021135827, filed on Dec. 6, 2021, the entire contents of which are incorporated herein by reference.

FIELD OF TECHNOLOGY

The present disclosure relates to the field of enhancing user anonymity, e.g., by displaying content to a user based on a category of content elicited by the device of the user.

BACKGROUND

The diversity of computer systems and their use by users for various purposes are increasing at the present time. Computers and mobile devices have become an integral part of life. By means of various devices, users exchange messages by electronic mail, associate in messaging apps and social networks, use devices for online payment and for payment with the use of POS terminals for various goods and services, register on various resources (store-sites, media-hosting servers, government services and others) for timely receipt of notifications, for participation in bonus programs and loyalty programs, and for receiving online services.

Every registration of a user for the resources requires communication of some personal data about the user. For example, there may be a requirement to indicate a telephone number, an email address, the name of the user, and the age of the user.

One approach is to pass regulation, often government regulations, on processing of persona data. Then, in order protect the personal data of the user, the data is processed in a manner that complied with the regulations. For example, in the Russian Federation, processing of personal data is regulated by a Federal Law No. 152. In European countries, processing of personal data must comply with General Data Protection Regulation (GDPR). Similarly, in individual states of the USA, laws have been passed for regulating the processing of personal data—for example, the California Consumer Privacy Act or CCPA is user to protect personal data of the user in California.

However, regulations on processing of personal data cannot always protect user data from actions of persons with malicious intent. Cases are known in which big companies and well-known online resources have allowed leaks of personal data of users. For example, according to news sources, the online store "eBay" allowed the leaking of data on 145 million registration records of users (see e.g., https://www.cnbc.com/2014/05/22/hackers-raid-ebay-in-historic-breach-access-145-mln-records.html). In addition, at the present time, contextual advertising is being developed, whereby marketing materials are displayed to a user based on the interests of the user. In order to provide contextual advertising, existing systems and methods rely on storage of user profiles that have been built up while taking into account the interests of the user. However, the profiles of a user frequently contain categories that can be established by activities of the user on the Internet. For example, if the activity of the user is usage of search on various sites and servers for searching for information, goods or services, categories can be established and included in the profile of the user based on the search performed by the user. Thus, regulations do not address these types of leakages of personal data.

In addition, often, the profiles of the user are typically stored in a remote cloud server. Thus, in the event of a leakage of the user profiles due to a malicious act, the category of the user may be a type that cause severe consequences for the user. For example, the category may include disclosure of information about the user that the user would not wish to make public. For instance, a state of health of the user, an interest of the user, and the like may be disclosed.

Therefore, there is a need for a method and a system for improving how content is provided to a user.

SUMMARY

Aspects of the disclosure relate to enhancing user anonymity, more specifically, to systems and methods of a cloud server for providing content to a user while enhancing user anonymity. For example, the content may be provided by displaying the content to the user based on a category of the content elicited via the device of the user. The category of content is determined using at least one categorization rule.

In one exemplary aspect, a method of a cloud server for providing content to a user while enhancing user anonymity is disclosed, the method comprising: receiving data, from a user device, the data comprising at least one of: hash and type of intercepted search requests and site names, incrementing a value of a popularity counter of the received data, when the value of the popularity counter of the received data exceeds a predetermined threshold, sending an inquiry for the intercepted search requests and site names in plain form, and when the intercepted search requests and site names are received in plain form, performing categorization of the intercepted search requests and site names, and transmitting, to the user device, content associated with the intercepted search requests and rules for establishing a category of the content.

In one aspect, the cloud server receives hashes and types of intercepted search requests and site names from a plurality of users.

In one aspect, the incrementing of the value of the popularity counter of the received data is performed for a pair, the pair being formed from one hash and one type.

In one aspect, the categorization of the intercepted search requests and site names is performed by assigning tags to the intercepted search requests and site names.

In one aspect, the rules for establishing the category of the content are created, by the cloud server, using the assigned tags.

In one aspect, the rules for establishing the category of the content contain at least one logical condition that operates with a type and with a tag, wherein the type includes at least a domain and a request.

In one aspect, the method further comprises removing an Internet Protocol (IP) address of the user device from which the data is received upon reception of the data from the user device.

In one aspect, the method further comprises, when the value of the popularity counter of the received data does not exceed the predetermined threshold, computing, by the user device, a hash of the intercepted search request and site names, determining the type of the intercepted search request and site names, and transmitting the computed hash and the type of intercepted search request and site name to the cloud server.

According to one aspect of the disclosure, a system of a cloud server is provided for providing content to a user, the system comprising at least one memory; and at least one hardware processor coupled with the at least one memory and configured, individually or in combination, to: receive data, from a user device, the data comprising at least one of: hash and type of intercepted search requests and site names, increment a value of a popularity counter of the received data, when the value of the popularity counter of the received data exceeds a predetermined threshold, send an inquiry for the intercepted search requests and site names in plain form, and when the intercepted search requests and site names are received in plain form, perform categorization of the intercepted search requests and site names, and transmit, to the user device, content associated with the intercepted search requests and rules for establishing a category of the content.

In one exemplary aspect, a non-transitory computer-readable medium of a cloud server is provided storing a set of instructions thereon for providing content to a user, wherein the set of instructions comprises instructions for: receiving data, from a user device, the data comprising at least one of: hash and type of intercepted search requests and site names, incrementing a value of a popularity counter of the received data, when the value of the popularity counter of the received data exceeds a predetermined threshold, sending an inquiry for the intercepted search requests and site names in plain form, and when the intercepted search requests and site names are received in plain form, performing categorization of the intercepted search requests and site names, and transmitting, to the user device, content associated with the intercepted search requests and rules for establishing a category of the content.

The method and system of the present disclosure are designed to enable a cloud server to provide of content to a user, in a more optimal and effective manner, ensuring that the content is provided without disclosing personal data of the user. In addition, the establishment of user categories, is performed locally and is not stored in a cloud server. In the event of the leaking of data from the cloud server, data concerning the interests of the user will not be accessible to persons with malicious intent.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 2 illustrates a method for providing content to a user in accordance with aspects of the present disclosure.

FIG. 3 illustrates a method of a cloud server for providing content to a user in accordance with aspects of the present disclosure

DETAILED DESCRIPTION

Exemplary aspects are described herein in the context of a system, method, and a computer program of a cloud server for providing content to a user based on a category elicited on a device of a user and categorization rules in accordance with aspects of the present disclosure. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

The following terminologies and concepts are provided in order to clearly present the aspects of the present disclosure.

Figure 4:
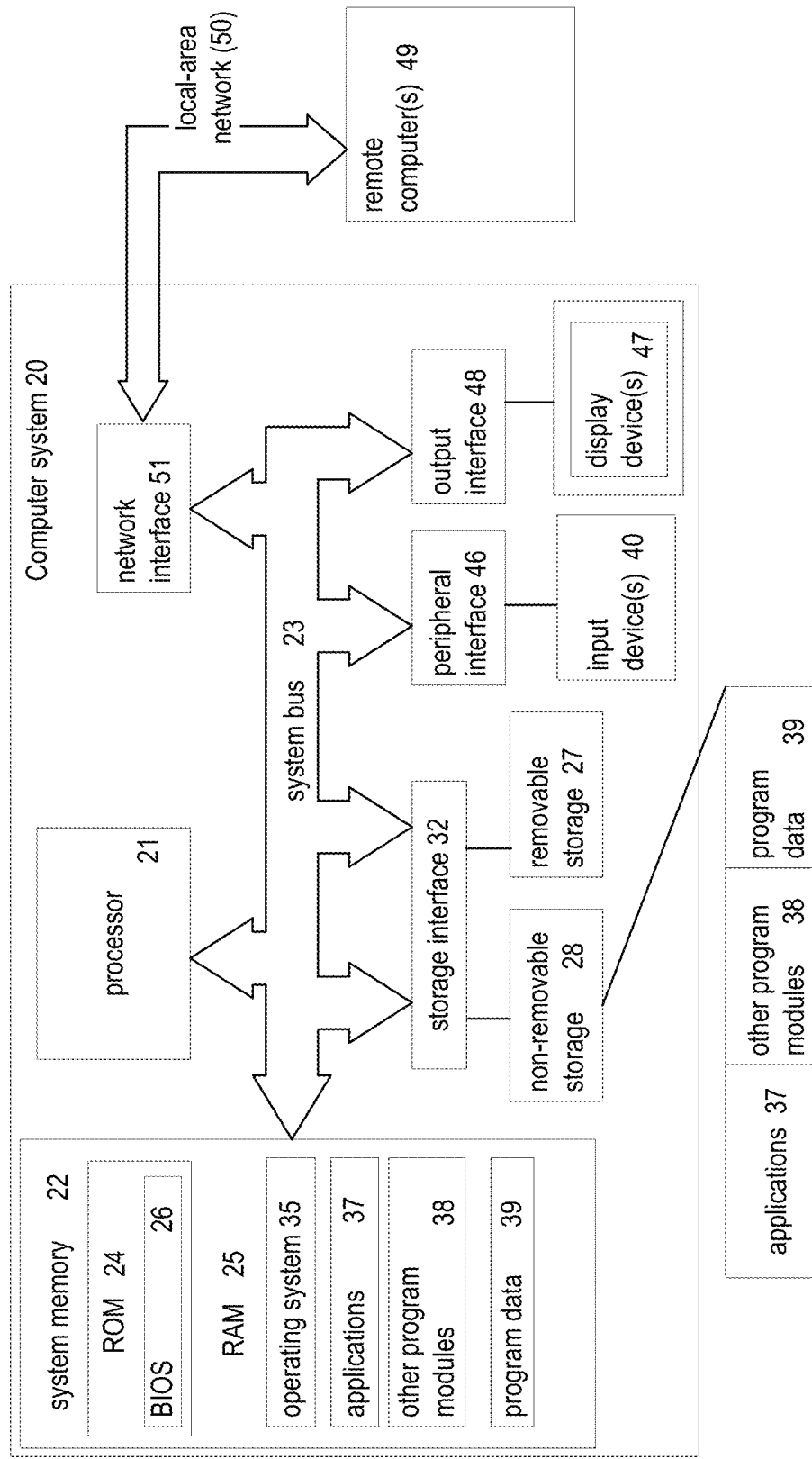
FIG. 4 presents an example of a general purpose computer system on which aspects of the present disclosure can be implemented.

A "remote server" and a "system tool" of the present disclosure refer to real devices, components, and groups of components of real devices realized using hardware, such as integrated microcircuits (application-specific integrated circuits, ASICs) or programmable gate arrays (field-programmable gate arrays, FPGAs), or, for example, in the form of a combination of software and hardware, such as a microprocessor system and a set of software instructions, and also on neuromorphic chips (neurosynaptic chips). The functionality of said system tool may have been realized exclusively by hardware, or in the form of a combination where some of the functionality of the system tool is realized by software, and some by hardware. In some aspects, some or all of the system tools may be implemented on the processor of a general-purpose computer (which, for example, is depicted in FIG. 4). In this case, the components (each of the tools) of the system may be realized within a single computing device, or distributed amongst several interconnected computing devices.

Digital content refers to information of a diverse character which is provided (for example, displayed) to a user. Digital content may be provided to a user in the form of text, images, various media formats (audio and video), and also in other known variants of the provision of information. The term "content" will be used hereinafter to refer to the digital content.

Figure 1:
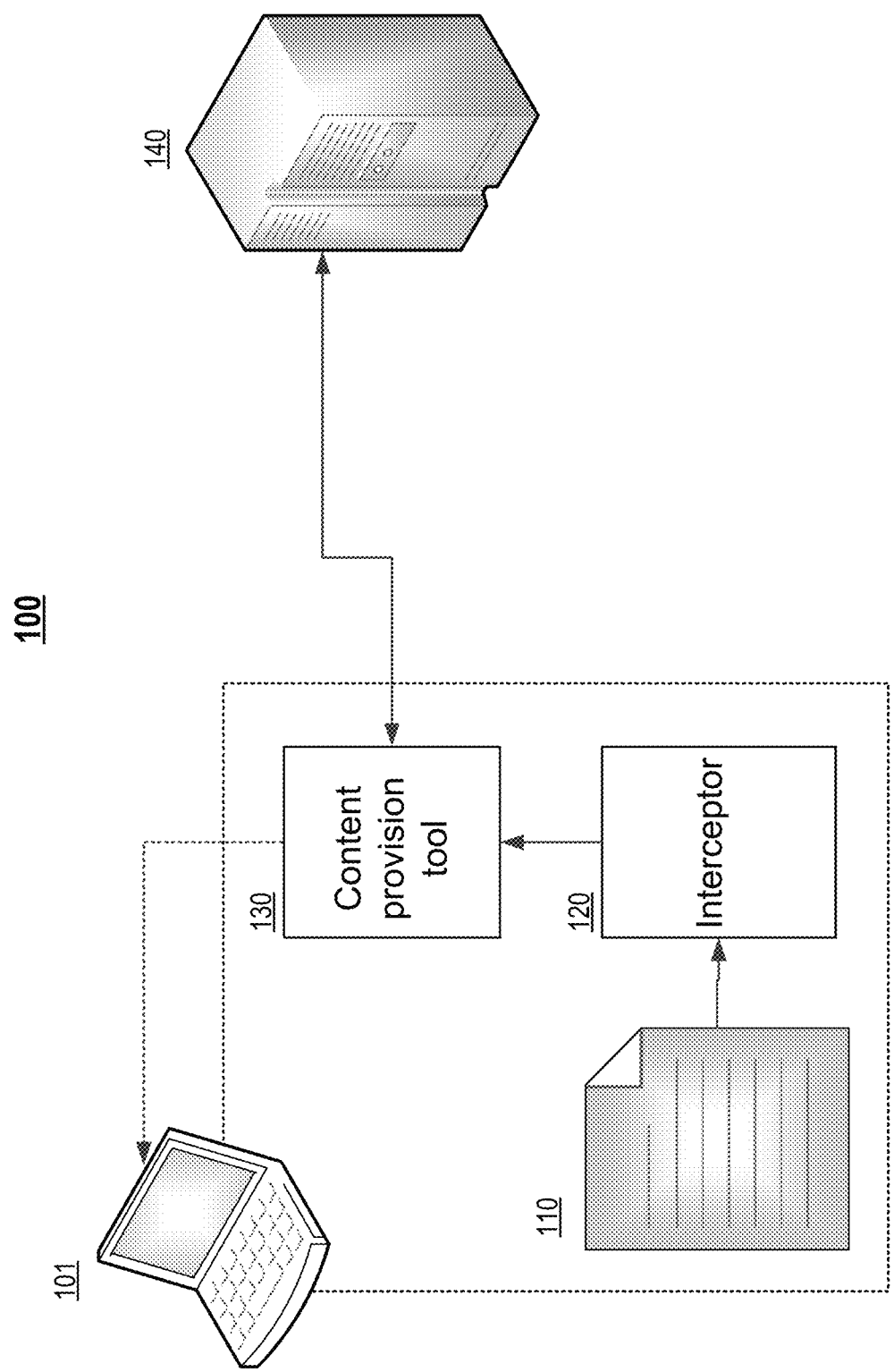
FIG. 1 illustrates a block diagram of an exemplary system for providing content to a user in accordance with aspects of the present disclosure.

FIG. 1 a block diagram of an exemplary system 100 for providing content to a user in accordance with aspects of the present disclosure. The block diagram of the system 100 for providing content to a user consists of an interceptor 120, a content-provision tool 130, a cloud security server 140 (hereinafter—cloud server 140).

In one aspect, the interceptor 120 and the content-provision tool 130 run on a computing device 101 of the user. In one aspect, the interceptor 120 and the content-provision tool 130 are components of a security application (for example, an anti-virus application). Examples of the computing device 101 of the user are a computer, a laptop, a tablet, a smartphone, and other devices. An example of a cloud server 140 is the Kaspersky Security Network (KSN).

The interceptor 120 is intended for intercepting user requests in the browser 110 which is implemented on the computing device 101 of the user. The interception of requests is carried out by the interceptor 120 both from a request input form on search sites (for example, "google.com", "yandex.ru", "yahoo.com") and from the address bar of the browser 110 (modern browsers allow the address bar to be used without explicit indication of an address as a search element, the address bar corresponding to a GET request).

In one aspect, the interceptor 120 intercepts requests communicated to the server (POST requests). In another aspect, the interceptor 120 intercepts the names of the sites that a user visits using the browser 110. For example, a user may type the phrase "how to protect passwords against theft and what software to use" in the search bar of the browser 110, and executes the specified search request. He or she visits the sites "securitylab.ru" and "anti-malware.ru". The interceptor 120 intercepts the aforementioned requests and site-names. Then, the interceptor 120 communicates the intercepted requests and site-names to the content-provision tool 130.

In one aspect, the content-provision tool 130 is intended for providing marketing materials to a user. In one aspect, the content-provision tool 130 is intended for providing informational materials.

In one aspect, the content-provision tool 130 is intended for establishing a category of the content based on the intercepted requests and site-names. The establishment of the category of the intercepted requests and site-names takes place using rules received by the content-provision tool 130 from the cloud server 140. The rules are used for establishing the category of the content, The functionality of the cloud server 140 within the scope of the present disclosure will be briefly described below.

In one aspect, the rules for establishing the category of the content are generally stored in the memory of the computing device 101 of the user. The rules for establishing the category of the content may contain at least one logical condition that operates with a type (domain, request) and with a tag. An example of a rule will be described below.

In one aspect, when the content-provision tool 130 is unable to elicit the category of content based on the intercepted requests and site-names using the rules for establishing the category of the content, the content-provision tool 130 processes the intercepted requests and site-names, computes their hashes and types, and forwards the computed data (including at least the hashes and types) to the cloud server 140.

For the example mentioned above, the content-provision tool 130 processes the search request, picking out (selecting) key terms. From the initial phrase, the content-provision tool 130 retains the key term "protect passwords", computes its hash, and specifies the "search request" type. The site-names are also processed by the content-provision tool 130, and domains are calculated from the site-names (if the site "securitylab.ru\article1" was intercepted. Then, "securitylab.ru" remains after the computation. Then, the hash is computed, and the "domain" type is assigned.

In this way, the content-provision tool 130 communicates the following data to the cloud server 140:
 hash=SHA256("protect passwords"), type=search request;
 hash=SHA256("anti-malware.ru"), type=domain; and
 hash=SHA256("securitylab.ru"), type=domain.

In one aspect, the content-provision tool 130 communicates a fuzzy hash to the cloud server 140, in order that variations of the key term—"protect passwords", "passwords protect", "protect password" and other variations—have the same hash.

If a request for the provision of data has come from the cloud server 140 in plain form, then in the case where any of the users executes a "how to protect passwords" or similar request (with the phrase "protect passwords"), the content-provision tool 130 communicates data to the cloud server 140 in plain form, namely:
 hash=SHA256("protect passwords"), type=search request, original="protect passwords".

If a request for the provision of data has come from the cloud server 140 in plain form, then in the case where any of the users visits the "securitylab.ru" site, the content-provision tool 130 communicates data to the cloud server 140 in plain form, namely:
 hash=SHA256("securitylab.ru"), type=domain, original="securitylab.ru".

In the case where the content-provision tool 130 has been able to elicit the category of content on the basis of the intercepted requests and site-names using the rules for establishing the category of the content, the content-provision tool 130 does not communicate the category of the content to the cloud server 140, but selects, from the contents (for example, all marketing materials) received from the cloud server 140, the content that corresponds to the category and displays said content to the user. The content that corresponds to the category may include one or more materials.

The cloud server 140 receives the computed hashes and type of the intercepted requests and site-names from the content-provision tool 130 of various users. For a hash-and-type pair, the cloud server 140 increments the popularity counter. In the case where the popularity counter exceeds a set threshold value, the cloud server 140 marks the hash-and-type pair with a note that the pair is "allowed to be sent in plain form". In this way, as mentioned above, if any of the users executes a "how to protect passwords" request and/or if any of the users visits the "securitylab.ru" site, the content-provision tool 130 communicates data to the cloud server 140 in plain form. For those data for which the plain-form field ("original" from the examples above) has been populated, the cloud server 140 performs categorization by assigning tags to the intercepted requests and site-names. So, for the example above:
 the domain receives the "news" and "security" tags; and
 the request receives the "security" and "password" tags.

In one aspect, the categorization is performed, by the cloud server 140, using any method known in the relevant art for categorization of data. In one aspect, after execution of the categorization, the cloud server 140 does not send an inquiry for data in plain form from other users for the intercepted request and site-name.

With the use of the tags obtained as a result of categorization and information from customers interested in the dissemination of content, the cloud server 140 creates rules for establishing the category of the content.

In another aspect, the cloud server 140 receives ready-made content-establishment rules from customers based on results of the categorization.

In one aspect, a rule is created in the cloud server 140 by a specialist in information security based on requirements obtained for customers interested in the dissemination of content.

A rule for establishing the category of the content, as mentioned above, generally contains at least one logical condition that operates with a type (domain, request) and with a tag. An example of a rule may be as described below.

For example, information about a "Kaspersky password manager" product may need to be disseminated for a target audience of users interested in security of computing devices. Then, the customers may communicate information for the creation of a rule for establishing the category of the content, or the rule itself, to the cloud server 140. The rule will work if the user fulfills the following conditions:
 visits domains having "security" tags no fewer than N times; and
 has made a request with "security" and "password" tags no fewer than M times.

In one aspect, the cloud server 140 is also used for storing the aforementioned rules for establishing the category of the content, and for communicating the aforementioned rules to the content-provision tool 130. The content-provision tool 130 is installed on computing devices 101 of the users.

In one aspect, the cloud server 140 communicates, to the content-provision tool 130 on the computing devices 101 of the users, the content that needs to be displayed to the user, depending on the category elicited by the content-provision tool 130 with the assistance of the rule for establishing the category. In one aspect, the content comprises all marketing materials.

In this way, the content-provision tool 130 display content, namely information about the "Kaspersky password manager" product, to users who fulfill the conditions described above. For each user, the displaying is perform on a respective computing device 101 of the user.

In a preferred aspect, the cloud server 140 removes the IP address of the computing device 101 of the user upon receiving the data.

FIG. 2 illustrates a method 200 for providing content to a user in accordance with aspects of the present disclosure. The tools described in conjunction with FIG. 1 are used to implement the steps of method 200. For example, the interceptor 120, and the content-provision tool 130 may be implemented in a computing device of a user.

In step 210, using an interceptor 120, method 200 intercepts a search request and a site-name in a browser 110, and sends to a content-provision tool 130, the intercepted search request and site name.

In one aspect, the content-provision tool 130 is implemented on a computing device 101 of the user. In one aspect, the interceptor 120 is implemented on a computing device of the user.

In one aspect, the search requests are intercepted from an address bar of the browser 110. In one aspect, the search requests are intercepted from a request input form on a search site.

In step 220, using the content-provision tool 130, method 200 computes a hash of the intercepted search request and site-name, determine a type of the intercepted search request and site name, and transmits the computed hash and the type of intercepted search request and site-name to a cloud server 140.

In one aspect, the transmitting of the hash and the type of intercepted search request and site-name includes at least selecting key terms from within the search request.

In one aspect, the transmitting of the hash and the type of intercepted search request and site-name includes selecting domains from within the site-name.

In step 240, using the content-provision tool 130, method 200 transmits the intercepted request and site-name to the cloud server 140 in plain form.

In step 255, by the content-provision tool 130, method 200 receives, from the cloud server, content based on a categorization of the intercepted request and site-name, and rules for establishing a category of the content.

In one aspect, the categorization of the intercepted request and site-name is performed by assigning tags to the intercepted request and site-name.

In one aspect, the rules for establishing the category of the content contain at least one logical condition that operates with a type and with a tag, wherein the type includes at least a domain and a request.

In step 260, by the content-provision tool 130, when the rules for establishing the category of the content are executed, method 200 displays to the user, the content, wherein displaying is performed on the computing device 101 of the user in accordance with a category established based on the rules.

In one aspect, the content being displayed comprises marketing materials.

In another aspect, the content being displayed comprises informational materials.

The interceptor 120, the content-provision tool 130 and the cloud server 140 were described above in more detail in conjunction with the description of FIG. 1.

FIG. 3 illustrates a method 300 of a cloud server for providing content to a user in accordance with aspects of the present disclosure.

In step 320, by the cloud server, method 300 receives hash and type of intercepted search requests and site names from a user device.

In step 330, by the cloud server, method 300 increments a popularity counter of the received data.

In one aspect, the incrementing of the popularity counter includes:
when a popularity threshold is exceeded, sending, by the cloud server 140, an inquiry for intercepted requests and site-names in plain form; and
when the popularity threshold is not exceeded, the method 200 repeats step 220 until the popularity threshold is exceeded.

In step 340, by the cloud server, method 300 determines if the popularity counter exceeds a threshold. If the counter exceeds the threshold, the method 300 proceeds to step 345. Otherwise, step 220 of method 200 is repeated.

In step 345, by the cloud server, method 300 sends an inquiry for intercepted requests and site-names in plain form.

In step 347, by the cloud server, method 300 receives the intercepted requests and site-names in plain form.

In step 350, by the cloud server 140, based on the intercepted request and site-name received in plain form, method 300 performs categorization of the intercepted request and site-name, and transmits, to the content-provision tool 130, the content and rules for establishing a category of the content.

FIG. 4 is a block diagram illustrating a computer system 20 on which aspects of systems and methods for providing content to the user may be implemented. The computer system can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method of a cloud server for providing content to a user, the method comprising:
    receiving data, from a user device, the data comprising at least one of: hash and type of intercepted search requests and site names;
    incrementing a value of a popularity counter of the received data;
    when the value of the popularity counter of the received data exceeds a predetermined threshold, sending an inquiry for the intercepted search requests and site names in plain form; and
    when the intercepted search requests and site names are received in plain form, performing categorization of the intercepted search requests and site names, and transmitting, to the user device, content associated with the intercepted search requests and rules for establishing a category of the content.

2. The method of claim 1, wherein the cloud server receives hashes and types of intercepted search requests and site names from a plurality of users.

3. The method of claim 1, wherein the incrementing of the value of the popularity counter of the received data is performed for a pair, the pair being formed from one hash and one type.

4. The method of claim 1, wherein the categorization of the intercepted search requests and site names is performed by assigning tags to the intercepted search requests and site names.

5. The method of claim 4, wherein the rules for establishing the category of the content are created, by the cloud server, using the assigned tags.

6. The method of claim 1, wherein the rules for establishing the category of the content contain at least one logical condition that operates with a type and with a tag, wherein the type includes at least a domain and a request.

7. The method of claim 1, further comprising:
    removing an Internet Protocol (IP) address of the user device from which the data is received upon reception of the data from the user device.

8. The method of claim 1, further comprising:
    when the value of the popularity counter of the received data does not exceed the predetermined threshold, computing, by the user device, a hash of the intercepted search request and site names, determining the type of the intercepted search request and site names, and transmitting the computed hash and the type of intercepted search request and site name to the cloud server.

9. A system of a cloud server for providing content to a user, comprising:
    at least one memory; and
    at least one hardware processor coupled with the at least one memory and configured, individually or in combination, to:
        receive data, from a user device, the data comprising at least one of: hash and type of intercepted search requests and site names;
        increment a value of a popularity counter of the received data;
        when the value of the popularity counter of the received data exceeds a predetermined threshold, send an inquiry for the intercepted search requests and site names in plain form; and
        when the intercepted search requests and site names are received in plain form, perform categorization of the intercepted search requests and site names, and transmit, to the user device, content associated with the intercepted search requests and rules for establishing a category of the content.

10. The system of claim 9, wherein the cloud server receives hashes and types of intercepted search requests and site names from a plurality of users.

11. The system of claim 9, wherein the incrementing of the value of the popularity counter of the received data is performed for a pair, the pair being formed from one hash and one type.

12. The system of claim 9, wherein the categorization of the intercepted search requests and site names is performed by assigning tags to the intercepted search requests and site names.

13. The system of claim 12, wherein the rules for establishing the category of the content are created, by the cloud server, using the assigned tags.

14. The system of claim 9, wherein the rules for establishing the category of the content contain at least one logical condition that operates with a type and with a tag, wherein the type includes at least a domain and a request.

15. The system of claim 9, further comprising:
removing an Internet Protocol (IP) address of the user device from which the data is received upon reception of the data from the user device.

16. The system of claim 9, further comprising:
when the value of the popularity counter of the received data does not exceed the predetermined threshold, computing, by the user device, a hash of the intercepted search request and site names, determining the type of the intercepted search request and site names, and transmitting the computed hash and the type of intercepted search request and site name to the cloud server.

17. A non-transitory computer readable medium storing thereon computer executable instructions of a cloud server for providing content to a user, including instructions for:
receiving data, from a user device, the data comprising at least one of: hash and type of intercepted search requests and site names;
incrementing a value of a popularity counter of the received data;
when the value of the popularity counter of the received data exceeds a predetermined threshold, sending an inquiry for the intercepted search requests and site names in plain form; and
when the intercepted search requests and site names are received in plain form, performing categorization of the intercepted search requests and site names, and transmitting, to the user device, content associated with the intercepted search requests and rules for establishing a category of the content.

18. The non-transitory computer readable medium of claim 17, wherein the cloud server receives hashes and types of intercepted search requests and site names from a plurality of users.

19. The non-transitory computer readable medium of claim 17, wherein the incrementing of the value of the popularity counter of the received data is performed for a pair, the pair being formed from one hash and one type.

20. The non-transitory computer readable medium of claim 17, wherein the categorization of the intercepted search requests and site names is performed by assigning tags to the intercepted search requests and site names.

* * * * *